(12) United States Patent
Bostick et al.

(10) Patent No.: US 9,591,141 B1
(45) Date of Patent: *Mar. 7, 2017

(54) CONTROLLING CONFERENCE CALLS

(71) Applicant: International Business Machines Corporation, Armonk, NY (US)

(72) Inventors: James E. Bostick, Cedar Park, TX (US); Hernan A. Cunico, Holly Springs, NC (US); John M. Ganci, Jr., Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,477

(22) Filed: Aug. 11, 2015

(51) Int. Cl.
    *H04M 3/42* (2006.01)
    *H04M 3/56* (2006.01)
    *H04W 4/06* (2009.01)

(52) U.S. Cl.
    CPC .......... *H04M 3/564* (2013.01); *H04M 3/565* (2013.01); *H04W 4/06* (2013.01)

(58) Field of Classification Search
    USPC .............. 379/202.01; 370/261; 709/224, 227
    See application file for complete search history.

(56) References Cited

U.S. PATENT DOCUMENTS

| | | | |
|---|---|---|---|
| 4,796,293 A * | 1/1989 | Blinken ................ | H04M 3/563 370/260 |
| 8,400,489 B2 | 3/2013 | Le Goff et al. | |
| 8,600,025 B2 | 12/2013 | Walsh et al. | |
| 8,620,136 B1 | 12/2013 | Malegaonkar et al. | |
| 8,645,872 B2 | 2/2014 | Maxfield et al. | |
| 8,650,255 B2 | 2/2014 | O'Sullivan et al. | |
| 8,881,029 B2 | 11/2014 | Thapa | |
| 2006/0176831 A1 | 8/2006 | Greenberg et al. | |
| 2009/0089683 A1 | 4/2009 | Thapa | |
| 2009/0303984 A1 | 12/2009 | Clark et al. | |
| 2013/0063542 A1 | 3/2013 | Bhat et al. | |
| 2013/0063544 A1 | 3/2013 | Kanniappan et al. | |
| 2014/0219433 A1* | 8/2014 | Pai ........................ | H04M 3/565 379/202.01 |

(Continued)

FOREIGN PATENT DOCUMENTS

WO     2008086305 A2     7/2008

OTHER PUBLICATIONS

U.S. Appl. No. 14/966,491, filed Dec. 11, 2015, Entitled "Controlling Conference Calls".

(Continued)

*Primary Examiner* — Quynh Nguyen
(74) *Attorney, Agent, or Firm* — Walter L. Rudberg

(57) ABSTRACT

Embodiments of the present invention provide a method and system for determining participants for a conference call where the participants may be selected based on similar attributes as well as the descriptions of the conference call. Additionally, the conference call may be split into smaller breakout sessions, further separating the participants based on various attributes. Further, the conference call participants may be shuffled thereby creating different breakout sessions with different participants with like attributes. The conference call including the selected participants is initiated.

17 Claims, 4 Drawing Sheets

(56) References Cited

U.S. PATENT DOCUMENTS

2014/0267550 A1    9/2014   Nimri et al.
2015/0022625 A1    1/2015   Thapa

OTHER PUBLICATIONS

List of IBM Patents or Patent Applications Treated as Related, dated Dec. 11, 2015, 2 pages.
Pallotta, Vincenzo; "Content-Based Retrieval of Distributed Multimedia Conversational Data"; Information Retrieval and Mining in Distributed Environments; Studies in Computational Intelligence; 2011; pp. 183-212; vol. 324; Springer-Verlag Berlin Heidelberg.
U.S. Appl. No. 15/153,785, filed May 13, 2016, Entitled "Controlling Conference Calls".
List of IBM Patents or Patent Applications Treated as Related, Dated May 13, 2016, 2 pages.
Bostick et al., "Controlling Conference Calls", U.S. Appl. No. 15/293,671, filed Oct. 14, 2016, pp. 1-29.
IBM Appendix P.: "List of IBM Patents or Patent Applications to be Treated as Related", Dated Oct. 14, 2016, 2 pages.

\* cited by examiner

CONTROLLING CONFERENCE CALLS

BACKGROUND OF THE INVENTION

The present invention relates generally to the field of communication and, in particular, controlling conference calls over a network.

Conference calls provide a real time communication between two or more persons. Conference calls offer an 'in person' meeting experience, connecting participants across multiple continents and time zones. Specifically, conference calls provide a highly effective and convenient conversation medium between persons. For example, businesses use conference calls regularly to meet with remote parties, both internally and outside of their company, allowing businesses to reduce travel expenses and save time, while still maintaining the close relationships with customers and employees.

To create a satisfactory conference call, the conference calling system emulates what participants would experience during a regular 'in person' meeting. For example, a conference call may utilize audio, video and multimedia technology, creating a better user experience. Further, a conference call may include the ability to allow separate conference calls to be merged into one larger conference call. Moreover, a conference call may include the ability to have a sub-conference, or a breakout session with a particular set of the participants, apart from the main conference call.

SUMMARY

According to one embodiment of the present invention, a method for determining conference call participants is provided, the method comprising: determining, by one or more processors, a set of participants for a conference call, based in part on a set of first attributes and a description of the conference call; receiving, by one or more processors, an indication to split the conference call into at least two subsets of the conference call; determining, by one or more processors, at least two subsets of participants, from the set of participants, wherein each of the at least two subsets of participants have a set of similar attributes from the set of first attributes; and initiating, by one or more processors, the conference call comprising the set of participants.

Another embodiment of the present invention provides a computer program product for determining conference call participants, based on the method described above.

Another embodiment of the present invention provides a computer system for message determining conference call participants, based on the method described above.

DETAILED DESCRIPTION

Figure 1:
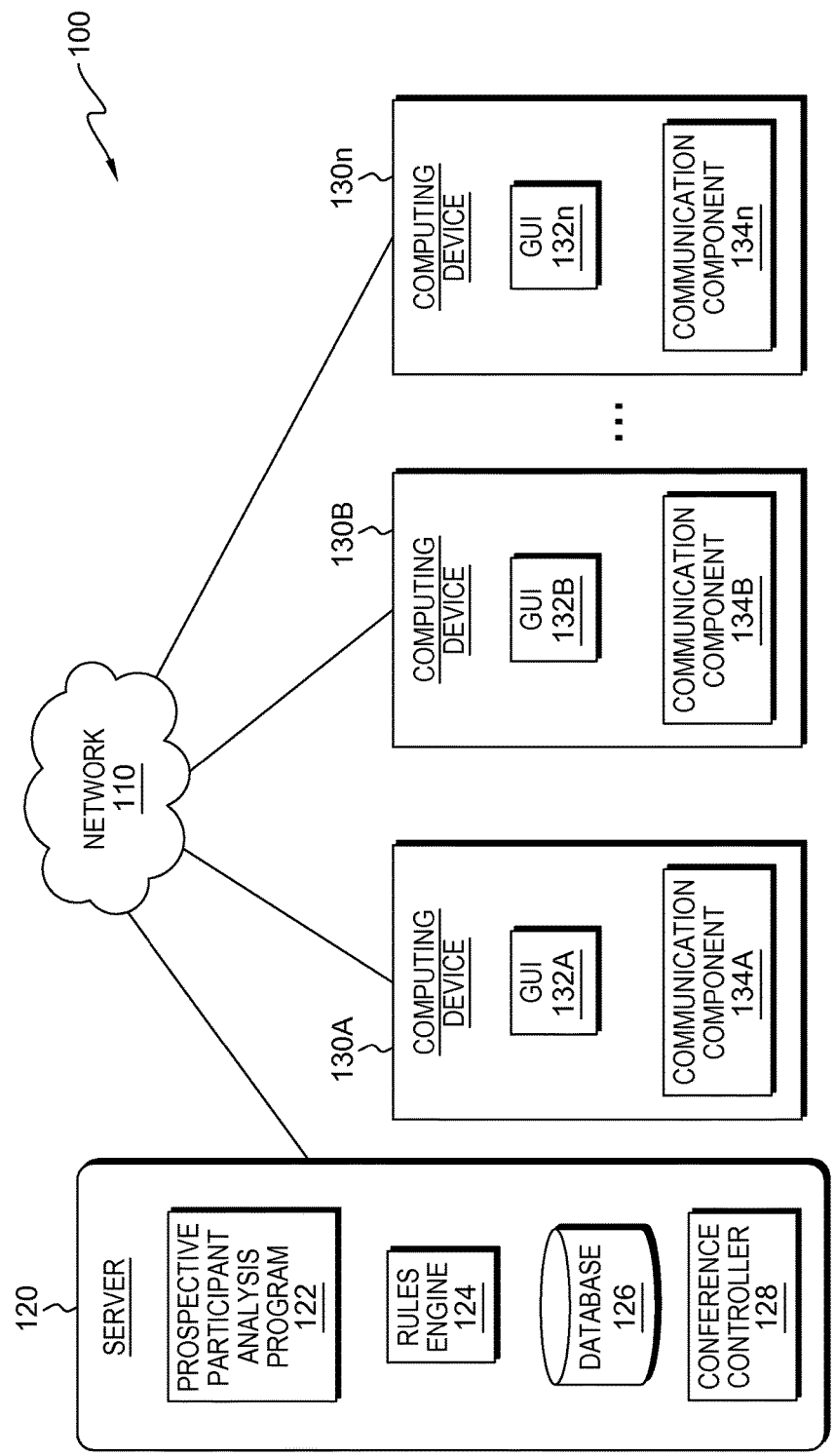
FIG. 1 is a functional block diagram illustrating a video conferencing environment, in accordance with an embodiment of the present invention.

Conference calls provide a cost effective method to allow face to face meetings, in real time, with global attendees. Embodiments of the present invention recognize that there are many mediums of conference calls ranging from audio only, audio/video, web based, etc. Video conferences provide attendees with the ability to interact and visibly communicate with one another providing both visual and verbal cues of the speaker(s) and audience. Additionally, video conferences may utilize multimedia technology. Some exemplary embodiments discussed herein utilize a video based conference call, however, it is noted that the embodiments described below may be utilized by alternative conference call mediums.

During a traditional conference there are scenarios where participants or the moderator may wish for the meeting to be broken out into multiple smaller groups. Specifically, participants of a large meeting may be broken up into smaller breakout sessions to discuss specific topics related to the main meeting as smaller more intimate meetings encourage discussions. Such smaller meeting sessions of a larger meeting are commonly known as breakout sessions. Breakout sessions are common in business meetings and educational settings and are often controlled by the presenter or instructor. Breakout sessions are generally a relatively shorter time duration of the main meeting, and typically have a set time interval.

To create an effective conferencing environment, it is desirable to emulate what participants would experience during a regular meeting. This includes having the ability to create virtual breakout sessions with a particular subset of participants from the main meeting, thereby creating sub-conference calls from the main conference call meeting.

Similar to breakout sessions, while participating in a conference call there are scenarios where participants of different conference calls need to be merged into one larger conference call. For example, if Jim is hosting a conference call with three participants, and Hernan is hosting a conference call with four participants, and the meetings may be benefited by combining both conference calls, it would be advantageous for Jim and Hernan to merge their independent meetings into a larger conference call.

Embodiments of the present invention may be utilized in a plurality of environments and functions. For example, the embodiments of the present invention may be utilized by: businesses, students, educators, researchers, government agencies, medical professionals, hospitals and the like.

Embodiments of the present invention provide a system and method which automatically predetermines who to invite to particular conference calls, as well as, automatically predetermining who to include in specific breakout sessions of a conference call by providing an analysis of potential participants, based on specific search criteria, user generated rules, as well as personal attributes, such as biographical information and personal affinities. A person's biographical data may include one's: employer, job title, job role, city, state, country, spoken languages, age, and the like. A person's affinity encompasses a person's interests beyond that of biographical data. For example, a person's affinity can include topics of connection (e.g., radio enthusiasts, bloggers, art critics, etc.); an organizational connection (e.g., workers who work at company A, workers in a department, etc.); a hierarchical connection (e.g., supervisors, workers, etc.); a job based connection (e.g., engineers, technicians, advertisers, clerks, lawyers, etc.); an age based connection (e.g., persons between 25 and 35 years of age, Generation X, retirees, etc.); a geographical connection (e.g., participants located in Russia, China, etc.); a technological connection (e.g., employees sharing the same expertise, interests, responsibilities, etc.), and any other suitable characteristic, trade, or commonality shared by various participants, that can correlate two or more participants.

Embodiments of the present invention obtain information that is relevant to a user, an organization, a project, etc. and utilizes the obtained information as the basis for determining whom to invite to particular conference calls. For example, embodiments of the present invention may utilize: cognitive analysis, contextual analysis, and analytics to determine information corresponding to the participants of a conference call. Additionally, an exemplary embodiment of the present invention may access a company database to determine the names of participants, as well as, the reporting structure of a participant.

Further, embodiments of the present invention provide the capability to evaluate and learn the participant's biographical data and affinities through facial recognition, and natural language processing (NLP), to more accurately determine who to invite to particular conference calls, as well as, how to organize specific breakout sessions. For example, through the use of NLP, potential participants that share biographical data or certain affinities may be asked to join particular conference calls or grouped together for particular breakout sessions that meet certain criteria.

Additionally, embodiments of the present invention provide the capability to aggregate the data of each conference call participant and provide real time action in administrating the conference call. Also, embodiments of the present invention provide a system and method that may self-learn, utilize pre-defined rules while maintaining a manual aspect to control the conference call.

The descriptions of the various scenarios, instances, and examples related to the present invention have been presented for purposes of illustration but are not intended to be exhaustive or limited to the embodiments disclosed.

The present invention will now be described in detail with reference to the figures. FIG. 1 is a functional block diagram illustrating a video conferencing environment 100, in accordance with one embodiment of the present invention. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

In the depicted exemplary embodiment, video conferencing environment 100 includes server 120, and computing devices 130a through 130n (130a-n), all interconnected over network 110.

In the exemplary embodiment network 110 may encompasses a number of types of networks such as, a local area network (LAN), an intranet, a wide area network (WAN), such as the Internet, a virtual local area network (VLAN), the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between server 120 and computing devices 130a-130n, in accordance with embodiments of the invention. Network 110 may also be the Internet representing a worldwide collection of networks and gateways that use Transmission Control Protocol/Internet Protocol (TCP/IP) protocols to communicate with one another. Network 110 may include a cable, a router, switches and/or a firewall. Network 110 may include wired, wireless or fiber optic connections.

In the exemplary embodiment server 120 may be a web server, a server computer such as a management server, or any other electronic computing system capable of sending and receiving data. In another embodiment server 120 represents a "cloud" of computers interconnected by one or more networks, where server 120 is a computing system utilizing clustered computers and components to act as a single pool of seamless resources when accessed through network 110. Server 120 includes prospective participant analysis program 122, rules engine 124, database 126 and conference controller 128.

Prospective participant analysis program 122 on server 120 analyzes data from database 126 and automatically pre-determines who might be a good choice for specific conference meetings and/or breakout sessions.

Prospective participant analysis program 122 may analyze historical data including but not limited to: prior conferences, participants, and topics. Prospective participant analysis program 122 may also analyze potential participant's biographical information as well as personal affinities for additional patterns. Prospective participant analysis program 122 may also utilize NLP wherein prospective participant analysis program 122 may derive the topic of the conference call, enabling the system to determine which participants should attend the conference call.

In an exemplary embodiment, through the use of NLP, prospective participant analysis program 122 expands on the knowledge stored in database 126 by systematically reading the subject and descriptions of any meeting notification to further refine its detection of patterns on which participants should attend which conference calls. Further, in an exemplary embodiment, through the use of NLP, prospective participant analysis program 122 may learn of participants' interests in the conference topic through the participants' spoken words, thereby allowing prospective participant analysis program 122 to further refine its detection of patterns on which participants should attend which conference calls. Additionally, prospective participant analysis program 122 further refines who should be included in breakout sessions using NLP analysis of the participant's spoken words in the main conference call discussion. Prospective participant analysis program 122 may store its analysis in database 126.

Generally, NLP enables computers to derive meanings from natural language input stemming from numerous sources. Prospective participant analysis program 122 in combination with NLP may be able to read and breakdown sentences from the description of a meeting and classify the meeting into specific subject areas. There are a variety of NLP models that can be used to classify a conference call description. For example, a NLP known as deep parsing breaks a sentence down into small phrases. Specifically, deep parsing breaks a sentence down into noun phrases and verb phrases, and then figures the prepositional phrases. Another example of a NLP model is known as Lemmatization. Lemmatization entails the grouping together of different inflected forms of a word in order that it can be analyzed as a single item, allowing for better accuracy in subject classification.

While analyzing prospective participant analysis program 122 detects patterns of similar participants, topics, and affinities from the historical data through the use of NLP and sends conference controller 128 the select participants for the conference call and/or breakout sessions. After analyzing all associated data, prospective participant analysis program 122 sends conference controller 128 the chosen participants for the upcoming conference call or breakout sessions.

Rules engine 124 on server 120 may contain various user generated rules to manage the conference call. For example, rules engine 124 may have rules generated by a user to determine the conduct of a participant joining the conference call, whereby the potential participant is granted the ability to accept or reject joining a merged conference call. Also, for example, rules engine 124 may have a user generated rule to always include a particular person or set of persons in all conference calls. In another example, rules engine 124 may have a user generated rule limiting the duration of each breakout session, whereby after the expiration of the specified time allotment, conference controller 128 automatically reunites all breakout session participants back to the main conference. In another example, breakout sessions based on user generated rules may be automatically initiated based on an occurrence of a specific pre-defined set of events.

Database 126 on server 120 can be implemented using any database architecture known in the art such as, for example, a relational database, an object-oriented database, and/or one or more tables. Database 126 stores all information received from a person's biographical information as well as personal affinities prospective participant analysis program 122 acquires through a user's input, employer or membership input, social media data mining and information derived from NLP. Information stored in database 126 may include: a participant's name, employer, job title, specialty roles, personal interests, religious, familial history, political views, known languages, and/or age. Additional information stored on database 126 includes historical data including but not limited to: prior conferences, participants, and topics. While depicted on server 120 in the exemplary embodiment, database 126 may be on a remote server or a "cloud" of computers interconnected by one or more networks utilizing clustered computers and components to act as a single pool of seamless resources, accessible to prospective participant analysis program 122 via network 110.

Conference controller 128 on server 120 may be configured to transmit and/or receive communication to/from one or more communicating computing devices 130*a-n*. These communication signals may be in any form suitable for communicating with one or more communication devices. Conference controller 128 sends, by a wire connection or wirelessly, a video of a video conference participant using computing device 130*a-n*. Alternatively, conference controller 128 sends, by a wire connection or wirelessly, audio of a conference call participant using computing device 130*a-n*. A participant is a person or potential person using a computing device 130*a-n* to connect to the conference. In an exemplary embodiment, the participant connects to a video conference with both video and audio capabilities, where the video is representative of the participants real-time or near real-time facial features and facial movements as well as audio of the participants dialog. Conference controller 128 on server 120 uses known video or web conferencing technologies to receive and display video, audio, and/or images.

Conference controller 128 on server 120 may be configured to maintain one or more conference communication sessions between computing device(s) 130*a-n*. For example, conference controller 128 may maintain two separate conference calls. Conference controller 128 may merge two independent conference calls together. Additionally, conference controller 128 may split an existing conference call into 2 or more separate and distinct conference calls. The merging and/or splitting of a conference call(s) may be performed in any suitable way. Examples of manually choosing to merge and/or split a conference call(s) are discussed below.

In the exemplary embodiment computing devices 130*a-n* may be any electronic computing device capable of instantaneous communication and data exchange. Additionally, computing devices 130*a-n* may be capable of communicating with server 120 over network 110. Examples of computing device 130 include: a mobile phone (e.g., a mobile phone device, cellular phones, Wi-Fi phones, smart phone device, tablet computer, laptop computer, desktop computers, handheld computers, netbooks etc.), media device, personal organizers, e-reading devices, smart TV's, computer, gaming device, phone device, personal-digital assistant, communication bridge device, and/or any other communication device capable of maintaining communication sessions with other communication devices. Computing devices 130*a-n* include a Graphical User Interface (GUI) 132*a-n*, respectively, and a communication component 134*a-n*, respectively.

Each computing device 130*a-n* may be associated with one or more participants (not shown).

Computing devices 130*a-n*, may include Graphical User Interface (GUI) 132*a-n*, respectively. GUI 132*a-n* may be configured to preform one or more user interface operations described herein, including but not limited to, providing to and/or receiving data from a user. Specifically, GUI 132*a-n* may receive input and display images, data and/or video received from conference controller 128 of the other participants or data presented during the conference. GUI 132*a-n* may be any element used that is capable of rendering image data and receiving user input during a conference. GUI 132*a-n* may be configured to provide output for display. For example, generating and displaying objects on GUI 132*a-n* as well as rendering one or more graphical objects representing one or more communication sessions. GUI 132*a-n* may also be configured to receive user input by way of touchscreen. For example, one or more predefined gestures may be detected by way of touch screen display and used to trigger the manual commencement and/or ending of a conference call, or the manual merging and/or splitting of breakout sessions. A predefined touch gesture may include any gesture that may be provided by a user and detected by way of touch screen display.

Additionally, GUI 132*a-n* may be configured to initiate the merging and/or splitting conference sessions in response to a detected predefined touch gesture. For example, the host of a conference call, may initiate through a gesture on GUI 132*a-n* a merge and/or a breakout sessions by sending a request for the merge and/or breakout session to the conference controller 128 on server 120. Conference controller 128 may respond to the request by merging or splitting up the conference call. Alternatively, conference controller 128 may respond (to the request by the host to merge a conference call and/or initiate breakout session) by accessing prospective participant analysis program 122 for potential conference call participants. Upon receipt of potential conference call participants, conference controller 128 may either automatically commence the requested action or transmit the list of potential participants to the host via GUI 132*a-n* for the host's approval, prior to initiating the requested action.

Additionally, GUI 132*a-n* may be configured to notify a conference call participant of an upcoming conference or breakout session and allow the participant the option to accept or reject an incoming conference call.

Computing devices 130a-n, also include communication component 134a through 134n (134a-n), respectively. Communication components 134a-n may be configured to preform one or more user interface operations described herein, including but not limited to, providing means for a user to communicate during the conference call. Specifically, communication components 134a-n may include but not limited to audio speakers, a microphone, and a video camera. Communication components 134a-n is used to transmit audio and/or video of one participant of the conference call to to/from the conference controller 128 with the other participants during a conference call in real-time.

Figure 4:
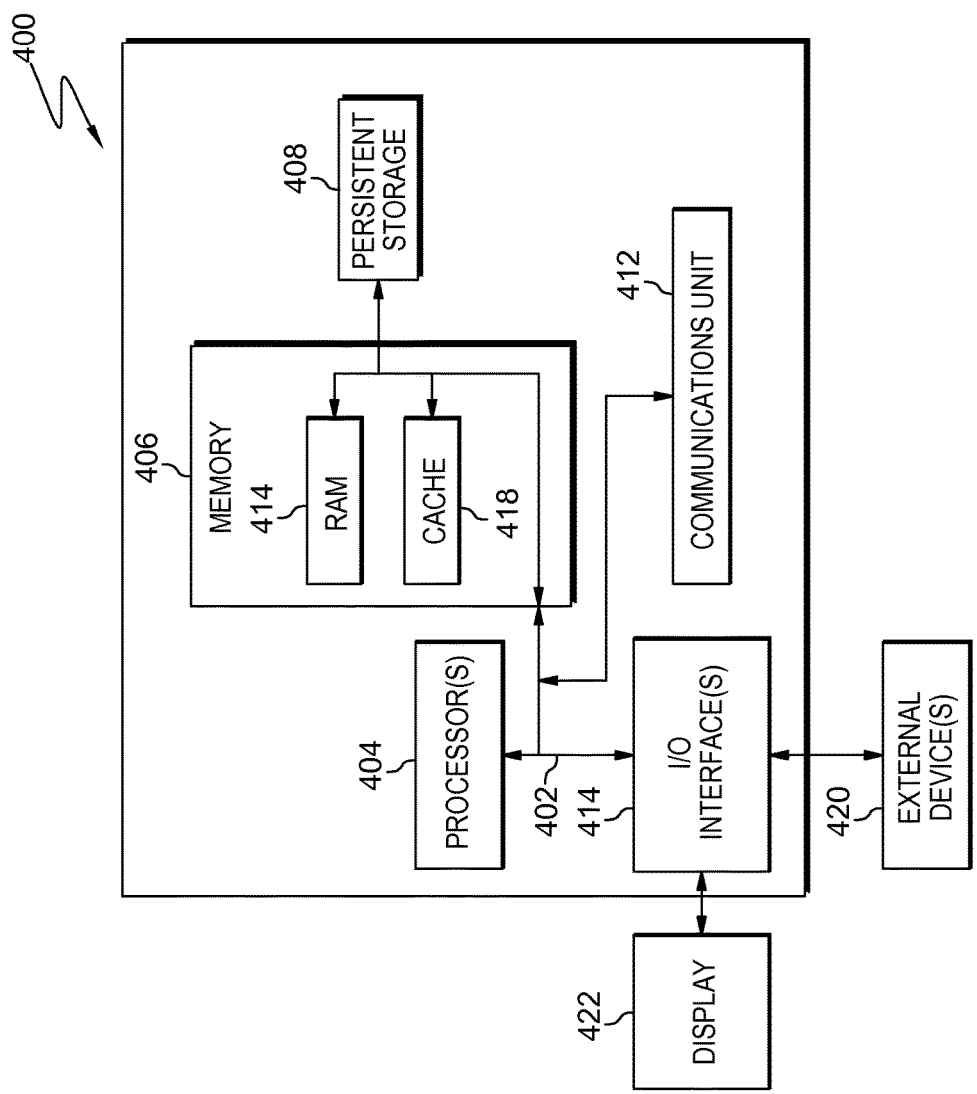
FIG. 4 depicts a block diagram of internal and external components of an electronic device, such as a computing device of FIG. 1, in accordance with an embodiment of the present invention.

Server 120 and computing device(s) 130a-n may each include internal and external hardware components as depicted in further detail with respect to FIG. 4. Additionally, video conferencing environment 100 may include additional computing devices, servers or other devices not shown.

Figure 2:
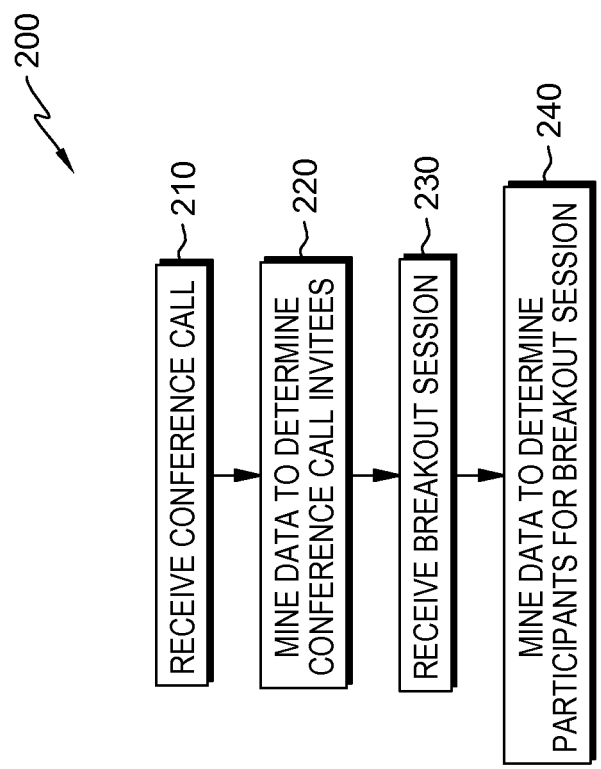
FIG. 2 is a flowchart illustrating operational steps for determining a conference call invitee, in accordance with an embodiment of the present invention.

FIG. 2 depicts flowchart 200 illustrating the operational steps for determining a conference call invitee, executed within video conferencing environment 100 of FIG. 1, in accordance with an embodiment of the present invention.

In step 210, prospective participant analysis program 122 receives an indication of an upcoming conference call. The host of a conference call is typically in charge of the conversation, is the main speaker during the conference call, and the host often chooses the date time and subject of a conference call. A conference call host may conduct the setup of a conference call as well as conduct the conference call itself on computing device 130a, while participants utilize computing devices 130b-130n to participate in the conference call.

In step 220 prospective participant analysis program 122 mines data to determine potential persons to invite to the conference call. In an exemplary embodiment, prospective participant analysis program 122 utilizing its self-learning capabilities, commences data mining database 126 to determine who to invite to the conference call. Prospective participant analysis program 122 may access database 126 to retrieve user information allowing it to derive patterns between potential participants and the description of each conference call, allowing prospective participant analysis program 122 to predict which invitees will be participants to a particular conference call. Finally, prospective participant analysis program 122 invites the potential conference call participants to the conference call.

Prospective participant analysis program 122 analyzes patterns based on, for example, NLP, rules engine 124, prior conference calls, and the prior actions of the host, to determine which potential participants to invite to a conference call. Through its pattern analysis, prospective participant analysis program 122 is capable of pairing particular persons with a specific conference call meeting automatically.

In an exemplary embodiment, through the use of natural language processing (NLP), prospective participant analysis program 122 may derive the topic of the conference call, enabling prospective participant analysis program 122 to determine which participants should attend the conference call. Generally, NLP may enable computers to derive meanings from natural language input stemming from numerous sources. Using a classification technique, NLP in combination prospective participant analysis program 122 may be able to read and breakdown sentences from the description of a meeting and classify the meeting into specific subject areas.

In an exemplary embodiment, through the use of rules engine 124, prospective participant analysis program 122 may determine which potential participants should attend conference call. Rules engine 124 comprises various rules the host created. For example, rules engine 124 may have a user generated rule to always include a particular person or set of persons in all conference calls or alternatively for only specific conference call topics.

In an exemplary embodiment, through the use of database 126, prospective participant analysis program 122 may determine which potential participants should attend the conference call. Database 126 contains data such as information received from a person's biographical information, personal affinities, prior conference call topics, prior conference call participants both invited and attended as well as prior prospective participant analysis program 122 past analysis, and the like. Prospective participant analysis program 122 may on each use or periodically, retrieve from database 126 previously conducted conference call participant lists to refine and improve future potential participant analysis for conference call, based on historical data and previous analysis. For example, in one exemplary embodiment, database 126 may acquire the aforementioned user data by requiring a registration process prior to allowing users access to the conference call system.

In the exemplary embodiment, prospective participant analysis program 122 has the capability to learn which persons to invite to specific conference calls. Prospective participant analysis program 122 can then improve its analysis for potential conference call attendees. Generally, the types of conference calls a person attends over time will increase the chance prospective participant analysis program 122 is able to predict which conference calls that person would most likely attend in the future. Simply, over time prospective participant analysis program 122 would come to know who normally attends such conference call and could combine that knowledge with the NLP of future conference call subjects and descriptions providing a memory bank of potential participants as well as unlikely participants.

Accordingly in step 220, prospective participant analysis program 122, utilizing its learning and pattern analysis capabilities, commences data mining to determine who to invite to the conference call. In an exemplary embodiment, NLP, rules engine 124, and database 126 may be used to assist prospective participant analysis program 122 in deriving a list of potential participants for a conference call. For example, the conference call host, the project manager, wants a project-wide conference call, where everyone involved in the project is on the conference call. If he titles the meeting "all hands meeting" along with the project name, prospective participant analysis program 122 utilizing both NLP and database 126, will determine whom should be invited and then send the invite to all personnel associated with the project. In the previous example, prospective participant analysis program 122 will identify which persons should be invited as, NLP will derive that the host wants all persons involved with the project to be included in the conference call, in combination with database 126, which comprises a list of persons with their job titles and job roles involved with the specific project.

After compiling a list of potential names for the conference call, prospective participant analysis program 122 may present to the host, the list of potential conference call participants. In one exemplary embodiment, the entire list may be displayed on GUI 132a, allowing the host to approve the list or make modifications such as added or removing specific names. The host may approve the list of potential participants and prospective participant analysis program 122 sends the invite to the list to conference controller 128, which controls the actual conference call.

Steps 230 and 240 are optional steps and only transpire if the host decides to have breakout sessions within the conference call. Often participants of a large meeting may be broken up into smaller breakout sessions to discuss specific topics related to the main meeting. Such smaller, more intimate groups are commonly known as breakout sessions as they encourage discussions. Therefore, if the host decides to hold smaller breakout sessions, then steps 230 and 240 are repeated for each breakout session.

In step 230, prospective participant analysis program 122 receives an indication that the host decides to have breakout sessions within the conference call. The host of a conference call may desire to have one or more breakout sessions. A conference call host may initiate a breakout session on computing device 130*a*, while participants utilize computing devices 130*b*-130*n* to partake in the conference call as well as the smaller breakout sessions. Each time the host initiates a breakout session, step 230 is repeated.

In step 240, prospective participant analysis program 122 determines the ideal persons to be included in each breakout session by providing an analysis of each participant of the meeting based on a variety of criteria. In an exemplary embodiment, prospective participant analysis program 122 utilizing its self-learning capabilities, commences data mining of database 126 to determine who should be included in each individual breakout session group of the conference call at large. Prospective participant analysis program 122 may access database 126 to retrieve user information allowing it to derive patterns between potential participants and the description of each breakout session, allowing it to predict who should be included in each breakout session. Finally, prospective participant analysis program 122 invites the potential conference call participants to each breakout session.

Similarly to that of step 210, in step 240, prospective participant analysis program 122 analyzes patterns based on, for example, NLP, rules engine 124, prior conference calls, prior breakout sessions and the prior actions of the host's, to determine which potential participants should be attend conference call. In an exemplary embodiment, through the use of natural language processing, prospective participant analysis program 122 may derive the topic of the conference call, enabling prospective participant analysis program 122 to determine which participants should attend the conference call. Through its pattern analysis, prospective participant analysis program 122 is capable of pairing particular persons for a breakout session automatically.

In an exemplary embodiment, NLP in combination with prospective participant analysis program 122 may be able to read and breakdown sentences from the description of each breakout session and classify the sub-meeting into specific subject areas. Similarly, in an exemplary embodiment, through the use of rules engine 124, prospective participant analysis program 122 may determine potential participants should be attend conference call. In addition, prospective participant analysis program 122 may determine which potential participants should be attend conference call with the assistance of database 126. As previously discussed, database 126 contains data such as information received from a person's biographical information, personal affinities, prior conference call topics, prior breakout session topics, prior conference call participants both invited and attended, as well as, prior prospective participant analysis program 122 past analysis, and the like.

In the exemplary embodiment prospective participant analysis program 122 has the capability to learn which persons should typically be included in a respective breakout session group. Prospective participant analysis program 122 can then improve its analysis for potential attendees for each breakout session subgroup. Generally, the types of conference calls a person attends over time will increase the accuracy with which prospective participant analysis program 122 is able to predict which breakout sessions are ideal for that person to attend in the future. Simply, over time prospective participant analysis program 122 would come to know who normally attends such conference call and could combine that knowledge with the NLP of future conference call subjects and descriptions providing a memory bank of potential participants as well as unlikely participants.

For example, in an exemplary embodiment, a conference call host, the project manager, wants a project wide conference call, where everyone involved in the project is on the conference call. At some point during the conference call, the host wants the group to be split automatically based on each person's job role. If the host gives a description of the three breakout session as: (1) The project management team will continue to work on scheduling aspects, staffing plans and financial outlook; (2) Architects will brainstorm on how data will integrate from System A to database B; and (3) Architects will discuss a better understanding of the user interface. When the host commences the individual breakout sessions, three new conference calls will be generated comprising the participants of each respective breakout session. Prospective participant analysis program 122 utilizing both NLP and database 126, will determine whom should be included in each breakout session meeting. For instance, prospective participant analysis program 122 through NLP, will determine that breakout session 1 is for project managers, and finance personnel. Similarly, prospective participant analysis program 122 through NLP, will also determine that breakout session 2 concerns integration and data. Likewise prospective participant analysis program 122 through NLP, will also determine that breakout session 3 concerns the user interface. Accordingly, prospective participant analysis program 122 utilizing the participant information within database 126, will know whom should be included in each breakout session.

After prospective participant analysis program 122 compiles a list of potential names for each breakout session, the list is presented to the host. In one exemplary embodiment, the entire list may be displayed on GUI 132*a*, allowing the host to approve the list or make modifications such as added or removing specific names. The host may approve the list of potential participants for each breakout session.

The aforementioned process may be repeated for each breakout session, as indicated by the host of the conference call.

Figure 3:
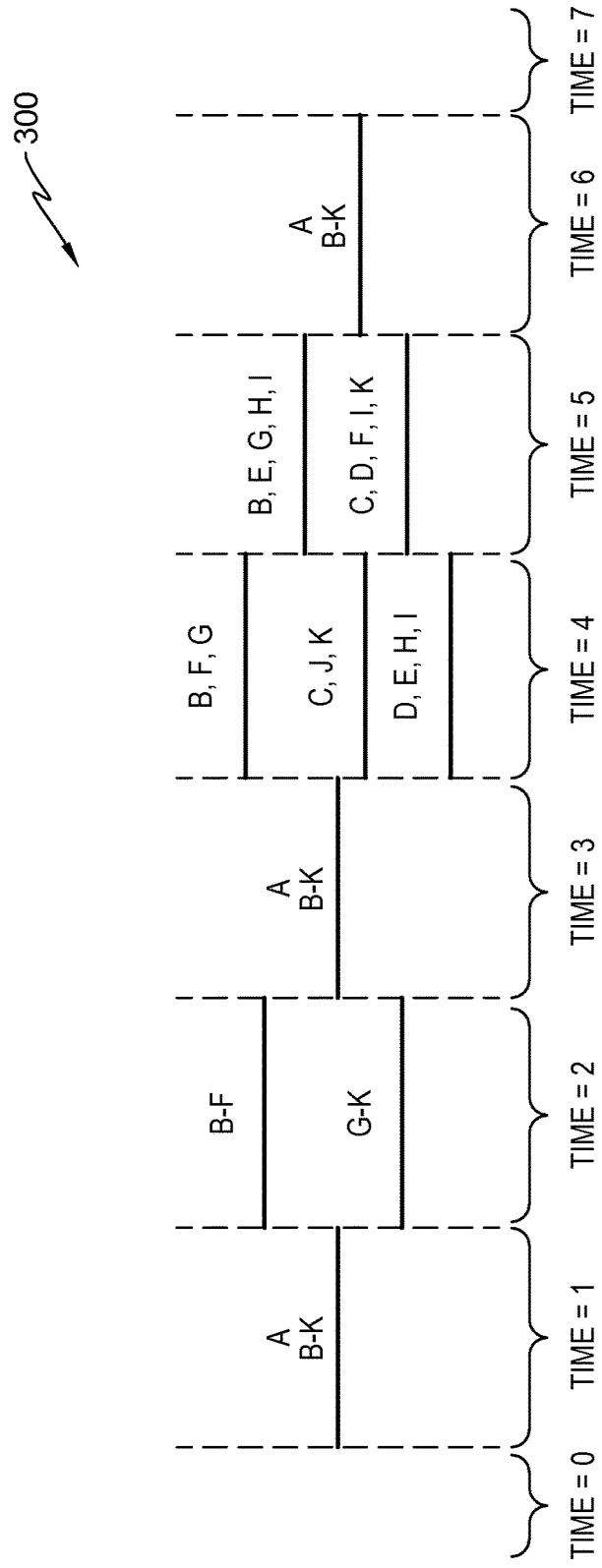
FIG. 3 is a diagram illustrating an example timeline of a conference call, in accordance with an embodiment of the present invention.

FIG. 3 is a diagram, generally designated 300, depicting an example timeline over an entire conference call with 7 different time increments, in accordance with an embodiment of the present invention.

FIG. 3 pertains to an exemplary conference call. In the example, a project leader creates a conference call to introduce the various members of his research team, as there are many team members who are remotely located. At Time=0, the project leader, 'A', creates a video conference call with three different breakout sessions, thereby allowing all the team members, members 'B' through 'K', an opportunity to get to know one another. The project leader, 'A', creates a conference call titled "All Hands Meeting" along with the project name and a brief description of the conference call.

The project leader, 'A', titled each break out session as "Meet and Greet" and included a brief description of each breakout session. The project leader, 'A', through the use of GUI 132A may create various rules in which to govern prospective participant analysis program 122. The rules project leader, 'A', creates are stored in rules engine 124. Exemplary rules project leader, 'A', might create may include, limiting the first and third breakout session to no more than five persons, and the second breakout session is limited to no more than four persons. The project leader, 'A', may also limit each breakout session for 15 minutes each. The project leader, 'A', may also require that each person must be in a different breakout session allowing him to meet at least 6 new team members.

Prospective participant analysis program 122 utilizing NLP, rules engine 124, and database 126, determines whom should be invited and then sends the invite to all personnel associated with the project. Prospective participant analysis program 122 utilizing both NLP and database 126, will determine whom should be included in the video conference call. Specifically, through NLP, prospective participant analysis program 122 may determine that based on the meeting title and description it will parse database 126 for all team members. After its analysis, prospective participant analysis program 122 may display the list of potential video conference participants, 'B', 'C', 'D', 'E', 'F', 'G', 'H', 'I', 'J' and 'K', on GUI 132A for project leader, 'A' to approve. Alternatively, prospective participant analysis program 122 may automatically invite team members, 'B', 'C', 'D', 'E', 'F', 'G', 'H', 'I', 'J' and 'K', to the conference call.

Continuing the example of FIG. 3, at Time=1, the project leader 'A' commences the video conference call, wherein all team members 'A' through 'K' are included. Here, all persons are part of the same video conference call. In one embodiment, all team members 'A' through 'K' have the ability to communicate with each other through communication component 134A through communication component 134K, respectively. In another embodiment all team members 'A' through 'K' have the ability to view and communicate with each other through GUI 132A through GUI 132K, respectively. In another embodiment, only project leader 'A' may communicate to all team members 'A' through 'K', however all team members 'A' through 'K' have the ability to view each other through GUI 132A through GUI 132K, respectively.

At Time=2, the conference call is split into two breakout sessions. Just prior to Time=2, the project leader 'A' commences the first video conference breakout session. In one embodiment, project leader 'A' through an input on GUI 132A, conference controller 128 automatically splits the group into two breakout sessions. Prospective participant analysis program 122 utilizing NLP, rules engine 124 and database 126, determines whom should be included in each of the two breakout sessions, and then conference controller 128 splits participants 'B' through 'K', into their respective breakout sessions. Specifically, through NLP and rules engine 124, prospective participant analysis program 122 may determine that based on the meeting title and description to parse database 126 for team members with similar affinities. In one exemplary embodiment, after its analysis, prospective participant analysis program 122 may display the list of potential breakout session participants for project leader, 'A' to review. Alternatively in another embodiment, after its analysis, prospective participant analysis program 122 may automatically transmit participants 'B' through 'K', respective breakout sessions to conference controller 128 eliminating project leader, 'A' review. Regardless, of the implementation, conference controller 128, through prospective participant analysis program 122, establishes participants 'B', 'C', 'D', 'E', and 'F' in one breakout session while 'G', 'H', 'I', 'J' and 'K' are in a different breakout session.

At Time=3, conference controller 128 reunites all participants, 'A' through 'K' back into a singular video conference. Time=3 is similar to Time=1. In one exemplary embodiment, project leader, 'A' may create a rule that requires after a specific allotment of time, all conference call participants are reunited into a singular conference call. In an alternative embodiment, project leader 'A', through a gesture on GUI 132A, may merge the two independent conference calls into a singular conference call.

During Time=4, the conference call is split into three individual breakout sessions. Similarly, to Time=2, in one embodiment, project leader 'A' through an input on GUI 132A, conference controller 128 automatically splits the group into three independent conference call sessions. Prospective participant analysis program 122 utilizing NLP, rules engine 124, and database 126, determines whom should be included in each of the three breakout sessions, and then conference controller 128 splits participants 'B' through 'K', into their respective breakout sessions. Specifically, through NLP and rules engine 124, prospective participant analysis program 122 may determine that based on the meeting title and description to parse database 126 for team members with similar affinities. In one exemplary embodiment, after its analysis, prospective participant analysis program 122 may display the list of potential breakout session participants for project leader, 'A' to review. Alternatively in another embodiment, after its analysis, prospective participant analysis program 122 may automatically transmit participants 'B' through 'K', respective breakout sessions to conference controller 128 eliminating project leader, 'A' review. Regardless of the implementation, conference controller 128, through prospective participant analysis program 122, establishes participants 'B', 'F' and 'G' are in one breakout session, C', 'J' and 'K' are in a different breakout session while 'D', 'E', 'H', and 'I' are in the third breakout session.

During Time=5 the third video conference call breakout session commences. Similarly, to Time=2, in one embodiment, project leader 'A' through an input on GUI 132A, conference controller 128 automatically splits the group into two independent conference call sessions. In another embodiment, rules engine 124 demines that a specific time allotment has expired and whereby conference controller 128 automatically splits the group into two independent conference call sessions. Regardless of the embodiment, prospective participant analysis program 122 utilizing NLP, rules engine 124 and database 126, determines whom should be included in each of the two breakout sessions, and then conference controller 128 splits participants 'B' through 'K', into their respective breakout sessions. Specifically, through NLP and rules engine 124, prospective participant analysis program 122 may determine that based on the topic and description to parse database 126 for team members with similar affinities. In one exemplary embodiment, after its analysis, prospective participant analysis program 122 may display the list of potential breakout session participants for project leader, 'A' to review. Alternatively in another embodiment, after its analysis, prospective participant analysis program 122 may automatically transmit participants 'B' through 'K', respective breakout sessions to conference controller 128 eliminating project leader, 'A' review. Regardless, of the implementation, conference controller 128, through prospective participant analysis program 122, establishes participants 'B', 'E', 'G', 'H', and 'J' in one breakout session while 'C', 'D', 'F', 'I' and 'K' are in a different breakout session.

At Time=6, conference controller 128 reunites all participants, 'A' through 'K' back into a singular video conference. In one exemplary embodiment, project leader, 'A' may create a rule that requires after a specific allotment of time, all conference call participants are reunited into a singular conference call. In an alternative embodiment, project leader 'A', through a gesture on GUI 132A, may merge the two independent conference calls into a singular conference call. At Time=7, the video conference call concludes as each party disconnects.

FIG. 4 is a block diagram of internal and external components of a computer system 400, which is representative of the computer systems of FIG. 1, in accordance with an embodiment of the present invention. It should be appreciated that FIG. 4 provides only an illustration of one implementation, and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

Persistent storage 408 may include, for example, a plurality of magnetic hard disk drives. Programs are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Software and data used to practice embodiments of the present invention can be downloaded to computer system 400 through communications unit 412 (i.e., via the Internet, a local area network, or other wide area network). From communications unit 412, the software and data may be loaded to persistent storage 408.

I/O interface(s) 414 allows for input and output of data with other devices that may be connected to computer system 400. For example, I/O interface 414 may provide a connection to external devices 420, such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for determining conference call participants comprising:

determining, by one or more processors residing in a computing device configured to perform one or more user interface operations to communicate during a conference call, a set of participants for a conference call, based in part on a first set of attributes, a conference call topic, and a description of the conference call;

receiving, by one or more processors, a first indication to split the conference call into at least two subsets of the conference call;

determining, by one or more processors, at least two subsets of participants, from the set of participants, wherein determining each of the at least two subsets of participants further comprises:

applying, by one or more processors, a set of stored patterns to the set of participants for the conference call, wherein the set of stored patterns are based on historical data associated with a set of participants of previous conference calls;

identifying, by one or more processors, a set of similar attributes from the first set of attributes;

analyzing, by one or more processors, a plurality of spoken words of each participant from the set of participants, during the conference call, and a first set of relationships between facial expressions of each participant, from the set of participants, using facial recognition; and responsive to analyzing the plurality of spoken words of each participant, and the first set of relationships between facial expressions of each participant matching, by one or more processors, the plurality of spoken words of each participant to each conference call topic of the at least two subsets of the conference call; and initiating, by one or more processors, the conference call comprising the set of participants.

2. The method of claim 1, further comprising:
receiving, by one or more processors, a second indication to split the at least two subsets of the conference call into at least two new subsets of the conference call; and
determining, by one or more processors, at least two new subsets of participants, from the set of participants, wherein the at least two new subsets of participants are associated with the at least two new subsets of the conference call, and wherein determining each of the at least two new subsets of participants comprises:
identifying, by one or more processors, one or more connections between the set of attributes and the set of participants;
identifying, by one or more processors, a second set of relationships between the plurality of spoken words of each participant from the set of participants; and
identifying, by one or more processors, a third set of relationships between facial expressions of each participant, from the set of participants, using facial recognition.

3. The method of claim 1, further comprising:
receiving, by one or more processors, a request to merge the at least two subsets of participants into a single conference call; and
responsive to receiving the request to merge the at least two subsets of participants into the single conference call, combining, by one or more processors, the at least two subsets of the conference call into the single conference call.

4. The method of claim 1, wherein the first set of attributes comprise at least two of:
the conference call topic;
a hierarchical relationship between the set of participants;
a job based relationship between the set of participants;
an age based relationship between the set of participants;
geographic location based relationship between the set of participants;
technological connections between the set of participants;
commonalties shared by the set of participants; and
a prior analysis of the set of participants of the conference call.

5. The method of claim 1, wherein the first indication to split the conference call into at least two subsets of the conference call is based on a predetermined time interval.

6. The method of claim 1, wherein determining the set of participants for the conference call, further comprises:
analyzing, by one or more processors, the conference call topic using a natural language processor, wherein a rule is established, specifying a relationship between the set of participants and the conference call topic.

7. A computer program product comprising:
a non-transitory computer readable storage medium and-
_program instructions stored on the non-transitory computer readable storage medium, the program instructions comprising:
program instructions to determine a set of participants for a conference call, based in part on a first set of attributes, a conference call topic, and a description of the conference call;
program instructions to receive a first indication to split the conference call into at least two subsets of the conference call;
program instructions to determine at least two subsets of participants, from the set of participants, wherein determining each of the at least two subsets of participants further comprises:
program instructions to apply a set of stored patterns to the set of participants for the conference call, wherein the set of stored patterns are based on historical data associated with a set of participants of previous conference calls;
program instructions to identify a set of similar attributes from the first set of attributes;
program instructions to analyze a plurality of spoken words of each participant from the set of participants, during the conference call, and a first set of relationships between facial expressions of each participant, from the set of participants, using facial recognition; and
responsive to analyzing the plurality of spoken words of each participant and the first set of relationships between facial expressions of each participant, program instructions to match the plurality of spoken words of each participant to each conference call topic of the at least two subsets of the conference call; and
program instructions to initiate the conference call comprising the set of participants.

8. The computer program product of claim 7, further comprising:
program instructions to receive a second indication to split the at least two subsets of the conference call into at least two new subsets of the conference call; and
program instructions to determine at least two new subsets of participants, from the set of participants, wherein the at least two new subsets of participants are associated with the at least two new subsets of the conference call, and wherein determining each of the at least two new subsets of participants comprises:
program instructions to identify one or more connections between the et of attributes and the set of participants;
program instructions to identify a second set of relationships between the plurality of spoken words of each participant from the set of participants; and
program instructions to identify a third set of relationships between facial expressions of each participant, from the set of participants, using facial recognition.

9. The computer program product of claim 7, further comprising:
program instructions to receive a request to merge the at least two subsets of participants into a single conference call; and
responsive to receiving the request to merge the at least two subsets of participants into the single conference call, program instructions to combine the at least two subsets of the conference call into the single conference call.

10. The computer program product of claim 7, wherein the first set of attributes comprise at least two of:
the conference call topic;
a hierarchical relationship between the set of participants;
a job based relationship between the set of participants;
an age based relationship between the set of participants;
geographic location based relationship between the set of participants;
technological connections between the set of participants;
commonalities shared by the set of participants; and
a prior analysis of the set of participants of the conference call.

11. The computer program product of claim 7, wherein the first indication to split the conference call into at least two subsets of the conference call is based on a predetermined time interval.

12. The computer program product of claim 7, wherein program instructions to determine the set of participants for the conference call, further comprise:
   program instructions to analyze the conference call topic using a natural language processor, wherein a rule is established, specifying a relationship between the set of participants and the conference call topic.

13. A computer system comprising:
   one or more computer processors;
   one or more computer readable storage media;
   program instructions stored on the one or more computer readable storage media for execution by at least one of the one or more processors, the program instructions comprising:
   program instructions to determine a set of participants for a conference call, based in part on a first set of attributes, a conference call topic, and a description of the conference call;
   program instructions to receive a first indication to split the conference call into at least two subsets of the conference call;
   program instructions to determine at least two subsets of participants, from the set of participants, wherein determining each of the at least two subsets of participants further comprises:
      program instructions to apply a set of stored patterns to the set of participants for the conference call, wherein the set of stored patterns are based on historical data associated with a set of participants of previous conference calls;
      program instructions to identify a set of similar attributes from the first set of attributes;
      program instructions to analyze a plurality of spoken words of each participant from the set of participants, during the conference call, and a first set of relationships between facial expressions of each participant, from the set of participants, using facial recognition; and
      responsive to analyzing the plurality of spoken words of each participant and the first set of relationships between facial expressions of each participant, program instructions to match the plurality of spoken words of each participant to each conference call topic of the at least two subsets of the conference call; and
   program instructions to initiate the conference call comprising the set of participants.

14. The computer system of claim 13, further comprising:
   program instructions to receive a second indication to split the at least two subsets of the conference call into at least two new subsets of the conference call; and
   program instructions to determine at least two new subsets of participants, from the set of participants, wherein the at least two new subsets of participants are associated with the at least two new subsets of the conference call, and wherein determining each of the at least two new subsets of participants comprises:
      program instructions to identify one or more connections between the set of attributes and the set of participants;
      program instructions to identify a second set of relationships between the plurality of spoken words of each participant from the set of participants; and
      program instructions to identify a third set of relationships between facial expressions of each participant, from the set of participants, using facial recognition.

15. The computer system of claim 13, further comprising:
   program instructions to receive a request to merge the at least two subsets of participants into a single conference call; and
   responsive to receiving the request to merge the at least two subsets of participants into the single conference call, program instructions to combine the at least two subsets of the conference call into the single conference call.

16. The computer system of claim 13, wherein the first set of attributes comprise at least two of:
   the conference call topic;
   a hierarchical relationship between the set of participants;
   a job based relationship between the set of participants;
   an age based relationship between the set of participants;
   geographic location based relationship between the set of participants;
   technological connections between the set of participants;
   commonalities shared by the set of participants; and
   a prior analysis of the set of participants of the conference call.

17. The computer system of claim 13, wherein program instructions to determine the set of participants for the conference call, further comprise:
   program instructions to analyze the conference call topic using a natural language processor, wherein a rule is established, specifying a relationship between the set of participants and the conference call topic.

* * * * *